(12) United States Patent
Punke et al.

(10) Patent No.: US 7,722,829 B2
(45) Date of Patent: May 25, 2010

(54) PRESSURE-BALANCED, CATALYZED SOOT FILTER

(75) Inventors: Alfred Helmut Punke, Walle (DE); Torsten Wolfgang Mueller, Hannover (DE); Michel Deeba, East Brunswick, NJ (US); Kenneth Edwin Voss, Somerville, NJ (US); John Joseph Steger, Pittstown, NJ (US); Yiu Kwan Lui, Parlin, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 1185 days.

(21) Appl. No.: 11/218,840

(22) Filed: Sep. 2, 2005

(65) Prior Publication Data

US 2006/0057046 A1 Mar. 16, 2006

(51) Int. Cl.
*B01D 50/00* (2006.01)
(52) U.S. Cl. .................................................. 422/180
(58) Field of Classification Search ................. 422/168, 422/177, 180, 211, 212; 55/520–523
See application file for complete search history.

(56) References Cited

U.S. PATENT DOCUMENTS

| 4,714,694 A | 12/1987 | Wan et al. ................. 502/304 |
| 4,727,052 A | 2/1988 | Wan ........................... 502/327 |
| 5,057,483 A | 10/1991 | Wan ........................... 502/304 |
| 5,089,237 A | 2/1992 | Schuster et al. ............. 422/180 |
| 6,274,107 B1 | 8/2001 | Yavuz et al. .............. 423/213.5 |

FOREIGN PATENT DOCUMENTS

| EP | 0 984 142 A1 | 3/2000 |
| EP | 1 398 069 A2 | 3/2004 |
| EP | 1 486 248 A1 | 12/2004 |
| JP | 2003154223 | 5/2003 |
| WO | WO 01/12320 A1 | 2/2001 |

*Primary Examiner*—Tom Duong
(74) *Attorney, Agent, or Firm*—Scott S. Servilla; Diehl Servilla LLC; Melanie L. Brown

(57) ABSTRACT

The invention provides a catalyzed soot filter formed on a wall flow substrate having internal walls coated with catalyst compositions. The soot filter maintains a homogeneous flow of the exhaust gases through the internal walls of the substrate along the length of the filter due to the coating design. Both the efficiency and the durability of the catalytic function are increased over conventionally designed catalyzed soot filters. The catalyzed soot filter provides an integrated function for simultaneously treating the gaseous components of the exhaust (e.g., CO and HC) and the particulate matter deposited in the filter.

21 Claims, 4 Drawing Sheets

PRESSURE-BALANCED, CATALYZED SOOT FILTER

The present invention relates to a catalyst article useful for the treatment of exhaust gases from diesel engines.

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Emissions treatment systems for diesel engines must treat all of the components of the exhaust to meet emissions standards set by various regulatory agencies throughout the world.

The total particulate matter emissions of diesel exhaust contain three main components. One component is the solid, dry, solid carbonaceous fraction or soot fraction. This dry carbonaceous fraction contributes to the visible soot emissions commonly associated with diesel exhaust. A second component of the particulate matter is the soluble organic fraction ("SOF"). The SOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel. The third component of the particulate matter is the so-called sulfate fraction, which is formed from small quantities of sulfur components present in the diesel fuel.

Catalyst compositions and substrates on which the compositions are disposed are typically provided in diesel engine exhaust systems to convert certain or all of these exhaust components to innocuous components. For instance, oxidation catalysts that contain platinum group metals, base metals and combinations thereof, facilitate the treatment of diesel engine exhaust by promoting the conversion of both unburned hydrocarbons (HC) and carbon monoxide (CO) gaseous pollutants, and some proportion of the particulate matter through oxidation of these pollutants to carbon dioxide and water. Such catalysts have generally been disposed on various substrates (e.g., honeycomb flow through monolith substrates), which are placed in the exhaust of diesel engines to treat the exhaust before it vents to the atmosphere. Certain oxidation catalysts also promote the oxidation of NO to $NO_2$.

In addition to the use of oxidation catalysts, diesel particulate filters are used to achieve high particulate matter reduction in diesel emissions treatment systems. Known filter structures that remove particulate matter from diesel exhaust include honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust.

Typical ceramic wall flow filter substrates are composed of refractory materials such as cordierite or silicon-carbide. Wall flow substrates are particularly useful to filter particulate matter from diesel engine exhaust gases. A common construction is a multi-passage honeycomb structure (10) having the ends of alternate passages on the inlet and outlet sides of the honeycomb structure plugged (see FIG. 1). This construction results in a checkerboard-type pattern on either end. Passages plugged on the inlet axial end are open on the outlet axial end. This permits the exhaust gas with the entrained particulate matter to enter the open inlet passages, flow through the porous internal walls and exit through the channels having open outlet axial ends. The particulate matter is thereby filtered on to the internal walls of the substrate. The gas pressure forces the exhaust gas through the porous structural walls into the channels closed at the upstream axial end and open at the downstream axial end. The accumulating particles will increase the back pressure from the filter on the engine. Thus, the accumulating particles have to be continuously or periodically burned out of the filter to maintain an acceptable back pressure.

Catalyst compositions deposited along the internal walls of the wall flow substrate assist in the regeneration of the filter substrates by promoting the combustion of the accumulated particulate matter. The combustion of the accumulated particulate matter restores acceptable back pressures within the exhaust system. These processes may be either passive or active regeneration processes. Both processes utilize an oxidant such as $O_2$ or $NO_2$ to combust the particulate matter.

Passive regeneration processes combust the particulate matter at temperatures within the normal operating range of the diesel exhaust system. Preferably, the oxidant used in the regeneration process is $NO_2$ since the soot fraction combusts at much lower temperatures than those needed when $O_2$ serves as the oxidant. While $O_2$ is readily available from the atmosphere, $NO_2$ can be actively generated though the use of upstream oxidation catalysts that oxidize NO in the exhaust stream.

In spite of the presence of the catalyst compositions and provisions for using $NO_2$ as the oxidant, active regeneration processes are generally needed to clear out the accumulated particulate matter, and restore acceptable back pressures within the filter. The soot fraction of the particulate matter generally requires temperatures in excess of 500° C. to burn under oxygen rich (lean) conditions, which are higher temperatures than those typically present in diesel exhaust. Active regeneration processes are normally initiated by altering the engine management to raise temperatures in front of the filter up to 570-630° C. Depending on driving mode, high exotherms can occur inside the filter when the cooling during regeneration is not sufficient (low speed/low load or idle driving mode). Such exotherms may exceed 800° C. or more within the filter.

In coated wall flow filters, exposure to such high temperatures during regeneration events shortens the useful lifetime of the catalyst compositions coated along the length of the substrate. Moreover, different segments along the axial length of the substrate are disproportionately affected by the regeneration process. Deposition of the particulate matter is not homogeneous along the length of the wall flow filter, with higher proportions of the particulate matter accumulating in the downstream segment of the filter. Consequently, the temperatures are not homogeneously distributed over the length of the substrate but show a maximum temperature in the downstream segment during active regeneration events. Thus, the durability of the catalyst composition along the downstream segment limits the useful lifetime of the entire catalyst-coated wall flow substrate.

High material costs associated with platinum group metal-containing compositions augment the need to slow or prevent the degradation of catalyst coatings due to active regeneration events. Catalyst coatings disposed on wall flow filters often contain platinum group metal components as active catalyst components to ensure acceptable conversions of the gaseous emissions (HC, CO) of the diesel exhaust to innocuous components (e.g., $CO_2$, $H_2O$). The loadings of such components are generally adjusted so that the catalyst substrate meets emissions regulations even after catalyst aging. Consequently, coating designs that maximize the efficiency and durability of platinum group metal usage along the substrate are desirable.

Certain conventional coating designs for wall flow substrates have a homogeneous distribution of catalyst coating along the entire axial length of the internal walls. In such designs the platinum group metal concentration is typically adjusted to meet the emissions requirements under the most stringent conditions. Most often such conditions refer to the catalyst's performance after the catalyst has aged. The cost associated with the required platinum group metal concentration is often higher than is desired.

Other conventional coating designs for wall flow substrates employ concentration gradients of the platinum group metal components along the axial length of the substrate. In these designs certain catalyst zones (e.g., upstream zones) have a higher concentration of platinum group metals than do adjacent axial zones (e.g., a downstream zone). Typically, the internal walls of the axial zone where the higher concentration of platinum group metal components are disposed, will have a lower permeability than an adjacent zone having a lower concentration of platinum group metals due to a higher washcoat loading. A gas stream passing along the length of the inlet passage will travel through the internal wall in the segments that have the highest permeability. Thus, the gas stream will tend to flow through the internal wall segments that have lower concentration of platinum group metal components. This differential flow pattern can result in inadequate pollutant conversion. For instance, certain gaseous pollutants, e.g., unburned hydrocarbons, require contact with higher concentrations of platinum group metal components than do particulate components to achieve sufficient levels of combustion. This requirement is exacerbated during operating conditions where the exhaust temperatures are cooler, e.g., at startup.

SUMMARY OF THE INVENTION

In one aspect, the invention relates to a catalyzed soot filter having a wall flow substrate with an inlet end, an outlet end, a substrate axial length extending between the inlet end and the outlet end, and a plurality of passages defined by internal walls of the wall flow substrate. The plurality of passages have inlet passages with an open inlet end and a closed outlet end, and outlet passages with a closed inlet end and an open outlet end. The internal walls of the inlet passages have a first inlet coating that extends from the inlet end to a first inlet coating end, thereby defining a first inlet coating length. The first inlet coating length is less than the substrate axial length. The internal walls of the outlet passages have an outlet coating that extends from the outlet end to an outlet coating end, thereby defining a outlet coating length. The outlet coating length is less than the substrate axial length. The sum of the first inlet coating and outlet coating lengths is substantially equal to the substrate axial length.

The first inlet coating length defines an upstream zone and the outlet coating length defines a downstream zone. The first inlet coating contains at least one first inlet platinum group metal component. At least 50% of the platinum group metal components are present in the upstream zone.

In one embodiment of the catalyzed soot filter, the first inlet and outlet coatings are present on the wall flow substrate at a washcoat loading ratio of 0.5 to 1.5 first inlet coating/outlet coating. The first inlet coating is typically present in the upstream zone at a washcoat loading of 0.1 to 2.0 g/in$^3$, and the outlet coating is typically present in the downstream zone at a washcoat loading of 0.1 to 2.0 g/in$^3$.

Generally, the length of the upstream zone is from 20 to 80% of the substrate axial length. Preferably, the length of the upstream zone is from 30 to 70%, and more preferably, 40 to 60%, of the substrate axial length.

The first inlet platinum group metal component in the catalyzed soot filter is typically selected from a first inlet platinum component, a first inlet palladium component, a first inlet rhodium component, and a first inlet iridium component. Generally, the platinum group metal components are present in the inlet zone at a concentration of 5 to 180 g/ft$^3$. In one preferred embodiment, the first inlet platinum group metal is a first inlet platinum component.

In some embodiments of the catalyzed soot filter, there is at least one platinum group metal component present in the outlet zone at a concentration of from 2 to 90 g/ft$^3$. The outlet platinum group metal component is typically selected from the group consisting of an outlet platinum component, an outlet palladium component, an outlet rhodium component, and an outlet iridium component.

In some embodiments, both the inlet and outlet coatings of the catalyzed soot filter contain a refractory metal oxide selected from the group consisting of alumina, silica, silica-alumina, alumino-silicates, alumina-zirconia, alumina-chromia, alumina-rare earth metal oxides, titania, titania-silica, titania-zirconia, and titania-alumina.

In certain embodiments of the catalyzed soot filter, at least one of the inlet and outlet coatings contain a rare earth metal oxide selected from an oxide of cerium, praseodymium, lanthanum, neodymium and samarium. Alternatively or additionally, at least one of the inlet and outlet coatings contain a zeolite.

In one embodiment of the catalyzed soot filter, the wall flow substrate consists of the first inlet coating and the outlet coating.

In another embodiment of the catalyzed soot filter, the internal walls of the inlet passages also have a second inlet coating interposed between the inlet walls and the first inlet coating. The second inlet coating extends from the inlet end to the outlet end of the substrate.

In certain embodiments having the second inlet coating, the second inlet coating has a second inlet platinum group metal component. Typically, the second inlet platinum group metal component is selected from a second inlet platinum component, a second inlet palladium component, a second inlet rhodium component, and a second inlet iridium component. In these embodiments, the second inlet platinum group metal component is generally present at concentrations up to 100 g/ft$^3$, is preferably present at 10 to 100 g/ft$^3$, and is more preferably present at 10 to 60 g/ft$^3$.

In one preferred embodiment of the catalyzed soot filter, at least one of the inlet or outlet coatings contain 0.1 to 2.0 g/in$^3$ of gamma alumina or silica-alumina, and from 0.05 to 1 g/in$^3$ of ceria-zirconia-praseodymia composite.

In another preferred embodiment of the catalyzed soot filter, at least one of the inlet or outlet coatings contain from 0.1 to 2.0 g/in$^3$ of gamma alumina or silica-alumina, 0.05 to 1 g/in$^3$ of ceria-zirconia-praseodymia composite; and 0.025 to 0.25 g/in$^3$ of a zeolite selected from the group consisting of Beta-zeolite, iron-doped Beta zeolite, USY-zeolite and ZSM-5 zeolite.

Another embodiment of the invention relates to a method of treating an exhaust gas stream comprising soot, NOx, CO and unburned hydrocarbons to form a purified gas stream using the zone coated soot filter described herein. The method includes passing the exhaust gas stream through the catalyzed soot filter to remove soot, NOx, CO and unburned hydrocarbons and thereby form the purified gas stream.

In a second aspect, the invention relates to an exhaust article that is formed on a catalyst coated wall flow filter substrate that contains an inlet zone and an outlet zone which is downstream of the inlet axial zone. The inlet zone contains a relatively high concentration of platinum group metal component disposed therein relative to the outlet axial zone. Among other things, the exhaust article provides high conversion of exhaust gas pollutants with minimal overall platinum group metal component material costs. The exhaust article has a wall flow substrate with an inlet end, an outlet end, having a length extending between the inlet end to the outlet end and a plurality of passages defined by the internal walls of the wall flow substrate. At least some of the passages have an opening at the inlet end and are plugged at the outlet end, and at least some of the passages have an opening at the outlet end are plugged at the inlet end.

A first catalyst coating is disposed on the internal walls of the wall flow substrate from the outlet end to a first coating end and extending for at least part of the length of the wall flow substrate. The first catalyst coating contains a first co-formed ceria-zirconia-praseodymia composite and a first refractory metal oxide.

A second catalyst coating is disposed on the internal walls of the wall flow substrate from the inlet end to a second coating end, thereby defining an inlet zone. The inlet zone is generally no more than 50% of the length of the wall flow substrate, and is preferably no more than 40% (and more preferably no more than 30%) of the length of the wall flow substrate. The second catalyst coating contains a second platinum group metal component.

As used herein, including the claims, the term "second platinum group metal components" refer to platinum group metals or oxides thereof that are present in the second catalyst coating. Similarly, the term "first platinum group metal components" refer to platinum group metals or oxides thereof that are present in the first catalyst coating. Preferred platinum group metal components for both the first and second catalyst coatings include platinum, palladium and rhodium components.

In a preferred embodiment of the second aspect, the first catalyst coating extends for at least 80% of the length of the wall flow substrate. Preferably, the first catalyst coating extends for the entire length of the wall flow substrate.

In some embodiments of the second aspect, the first catalyst coating contains from 20 to 80 wt. % of the first co-formed ceria-zirconia-praseodymia composite and from 20 to 80 wt. % of the first refractory metal oxide. Preferably, the first catalyst coating contains from 40 to 60 wt. % of the first co-formed ceria-zirconia-praseodymia composite; and from 40 to 60 wt. % of the first refractory metal oxide. Typically, the first co-formed ceria-zirconia-praseodymia composite contains 40 to 80 wt. % ceria, 5 to 25 wt. % zirconia, and 10 to 50 wt. % praseodymia.

The first catalyst coating may optionally contain a first platinum group metal component in some embodiments of the second aspect of the invention. When present the wall flow substrate contains from 0.1 to 10 g/ft³ of the first platinum group metal component. A preferred first platinum group metal component is a first platinum component.

Typically, the first refractory metal oxide is selected from the group consisting of alumina, zirconia, silica, titania, silica-alumina, zeolites, magnesium oxide, hafnium oxide, lanthanum oxide, yttrium oxide and combinations thereof. In one preferred embodiment of second aspect, the first refractory metal oxide is gamma alumina having a BET surface area of at least 10 m²/g.

In the second embodiment of the invention, the second platinum group metal component is typically present in the inlet zone at a concentration of from 10 to 250 g/ft³. In one preferred embodiment, the second platinum group metal component is present in the inlet zone at a concentration of from 25 to 200 g/ft³. The second platinum group metal component is typically selected from the group consisting of platinum, palladium and rhodium components. Such metal components may also be used in combinations with each other. In one preferred embodiment, the second platinum group metal is a second platinum component.

Generally, the second catalyst coating further contains a second refractory metal oxide selected from the group consisting of alumina, zirconia, silica, titania, silica-alumina, zeolites, magnesium oxide, hafnium oxide, lanthanum oxide and yttrium oxide. A preferred second refractory metal oxide is gamma alumina having a BET surface area of at least 10 m²/g. For instance, in some embodiments, the second platinum group metal component is supported on the gamma alumina.

In some embodiments of the second aspect, the second catalyst coating also contains a second co-formed ceria-zirconia-praseodymia composite. Generally, the second catalyst coating contains from 20 to 80 wt. % of the second co-formed ceria-zirconia-praseodymia composite; and from 20 to 80 wt. % of the second refractory metal oxide. Preferably, the second catalyst coating from 40 to 60 wt. % of the second co-formed ceria-zirconia-praseodymia composite; and from 40 to 60 wt. % of the second refractory metal oxide. The second co-formed ceria-zirconia-praseodymia composite generally contains 40 to 80 wt. % ceria, 5 to 25 wt. % zirconia and 10 to 50 wt. % praseodymia.

A preferred embodiment of the second embodiment of the invention relates to an exhaust article, having a wall flow substrate with an inlet end, an outlet end, having a length extending between the inlet end to the outlet end and a plurality of passages defined by the internal walls of the wall flow substrate. At least some of the passages have an opening at the inlet end and are plugged at the outlet end, and at least some of the passages have an opening at the outlet end are plugged at the inlet end. At least some of the passages have an opening at the inlet end and are plugged at the outlet end, and at least some of the passages have an opening at the outlet end are plugged at the inlet end.

A first catalyst coating is disposed on the internal walls of the wall flow substrate from the outlet end to a first coating end and extending for at least 80% of the length of the wall flow substrate. The first catalyst coating contains a first co-formed ceria-zirconia-praseodymia composite and from 20 to 80 wt. % of a first alumina component.

A second catalyst coating is disposed on the internal walls of the wall flow substrate from the inlet end to a second coating end, thereby defining an inlet zone. The inlet zone is no more than 50% of the length of the wall-flow substrate. The second catalyst coating contains a second platinum group metal component.

DEFINITIONS

The following terms shall have, for the purposes of this application, the respective meanings set forth below.

"Activated alumina" has its usual meaning of a high BET surface area alumina, comprising one or more of gamma-, theta- and delta aluminas.

"BET surface area" has its usual meaning of referring to the Brunauer, Emmett, Teller method for determining surface area by $N_2$ absorption. Unless otherwise specifically stated, all references herein to the surface area of the catalyst support components or other catalyst components means the BET surface area.

"Bulk form," when used to describe the physical form of a material (e.g., ceria), means the material is present as discrete particles that can be as small as 1 to 15 microns in diameter or smaller, as opposed to having been dispersed in solution onto another material such as gamma alumina. By way of example, in some embodiments of the invention, particles of ceria are admixed with particles of gamma alumina so that ceria is present in bulk form, as opposed to, for example, impregnating alumina particles with aqueous solutions of ceria precursors which upon calcination are converted to ceria disposed on the alumina particles.

"Downstream" and "Upstream," when used to describe catalyst zones, refer to the relative positions as sensed in the direction of the flow of the exhaust gas stream.

"First inlet platinum group metal component" refers to the platinum group metals or oxides thereof that are present in the first inlet coating. Similarly, "second inlet platinum group metal components" refer to platinum group metals or oxides thereof that are present in the second inlet coating, and "outlet platinum group metal components" refer to platinum group metals or oxides thereof that are present in the outlet coating.

DETAILED DESCRIPTION OF THE INVENTION

One embodiment of the invention relates to a catalyzed soot filter formed on a wall flow filter substrate. The wall flow filter substrate has internal walls coated with catalyst compositions. The soot filter maintains a homogeneous flow of the exhaust gases through the internal walls of the substrate along the length of the filter. Due to the soot filter's coating design and the choice of compositions deposited along its length, both the efficiency and the durability of the catalytic function are increased over conventionally designed catalyzed soot filters.

The catalyzed soot filter provides an integrated function for simultaneously treating the gaseous components of the exhaust (e.g., CO and HC) and the particulate matter deposited in the filter. Due to the coating design, the soot filter maintains the ability to catalyze the combustion of the gaseous pollutants even after the catalyst has aged.

Figure 1:
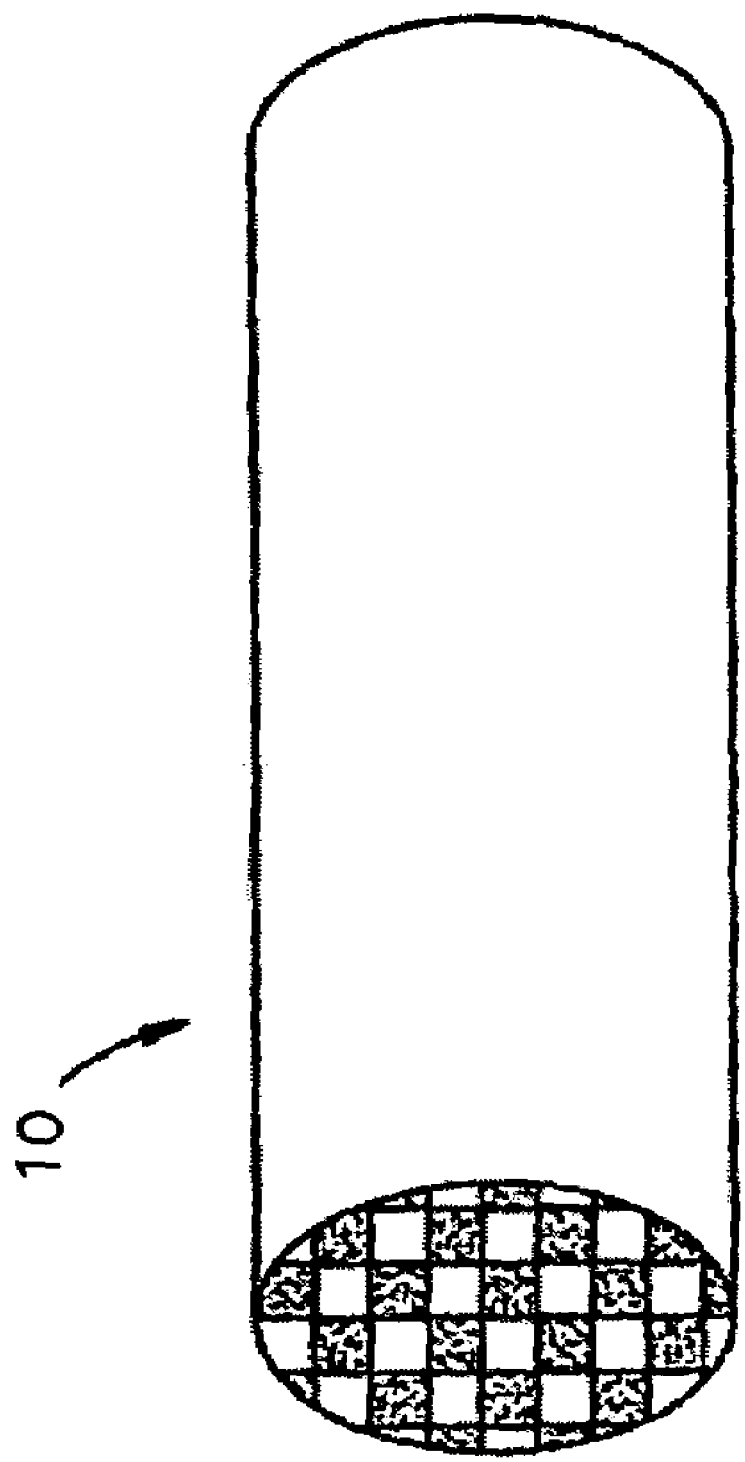
FIG. 1 shows a perspective view of a wall flow filter substrate (10).
Figure 2:
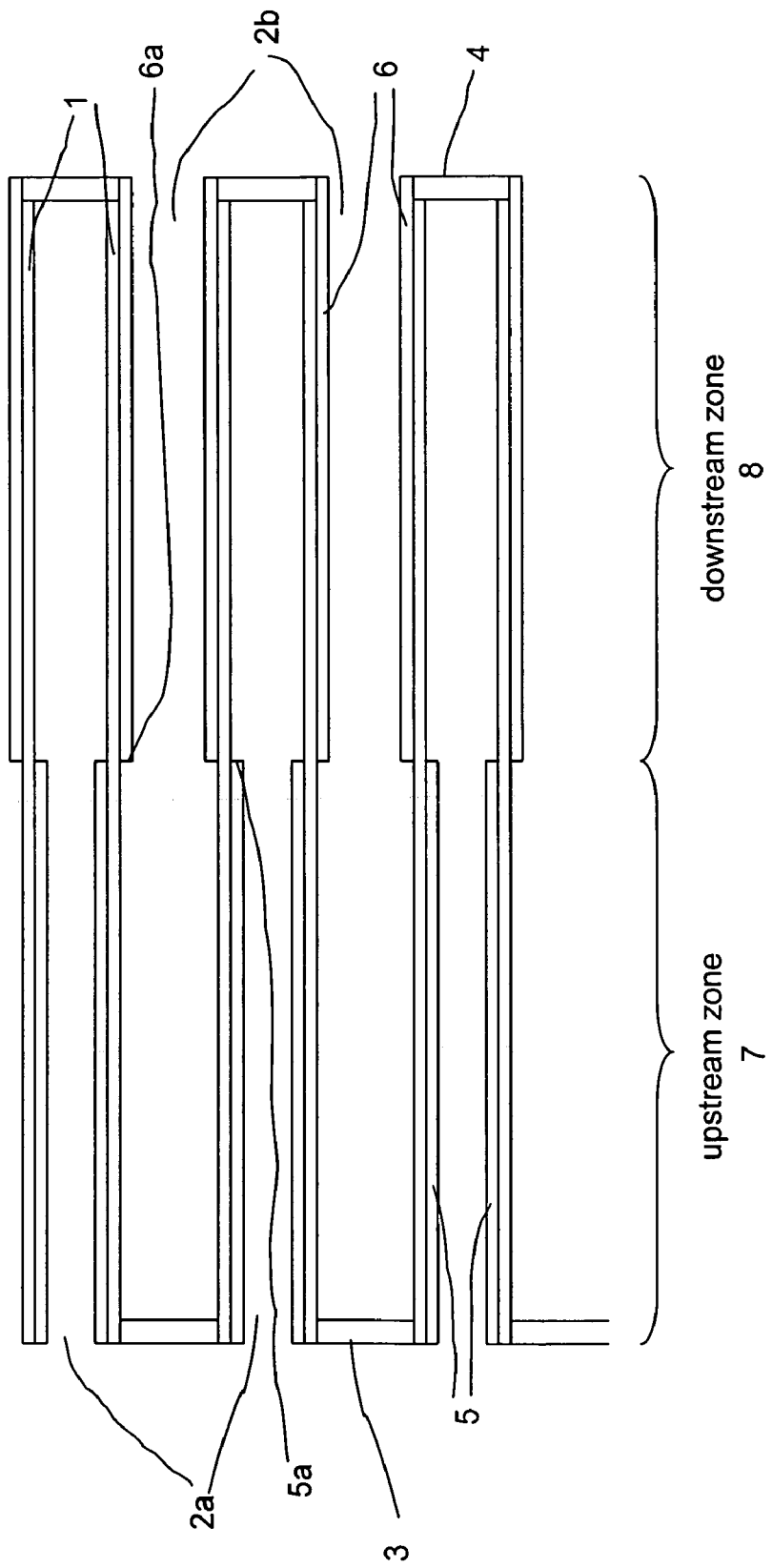
FIG. 2 shows one embodiment of the wall flow substrate of the invention (10) viewed in a cross sectional segment having a first inlet coating and an outlet coating.

One embodiment of the inventive catalyzed soot filter (10) is shown in a cross sectional segment in FIG. 2. A wall flow substrate has internal walls (1) which define a plurality of passages (2a, 2b). There are inlet passages (2a) and outlet passages (2b) that typically extend along the substrate's length. The substrate is formed so that the inlet passages have an opening at the inlet end (3) and are closed at the outlet end (4). Outlet passages are closed at the inlet end of the substrate and are open at the outlet end of the substrate. The internal walls of the substrate of the substrate are porous to allow the exhaust gas to pass through them.

Deposited on the internal walls of the inlet passages is a first inlet coating (5) that extends from the inlet end of the substrate to a first inlet coating end (5a) to define a first inlet coating length. The first inlet coating length is less than the substrate axial length. For example, the first inlet coating length can be from 20 to 80% of the substrate axial length. Preferably the first inlet coating length is from 30 to 70%, and more preferably from 40 to 60%, of the substrate's axial length.

Deposited on the internal walls of the outlet passages is an outlet coating (6) that extends from the outlet end of the substrate to an outlet coating end (6a) to define an outlet coating length. The outlet coating length is less than the substrate axial length. For example, the first inlet coating length can be from 20 to 80% of the substrate axial length. Preferably, the outlet coating length is from 30 to 70%, and more preferably from 40 to 60%, of the substrate axial length.

The sum of the first inlet coating and outlet coating lengths is substantially equal to the substrate axial length. As used herein, including the claims, when comparing the sum of the coating lengths to the substrate axial length, the term "substantially equal" means the comparative lengths are within 5% of each other.

The lengths of the first inlet coating and the outlet coating divide the substrate into two axial zones. The first inlet coating length defines an upstream zone (7) and the outlet coating length defines a downstream zone (8) along the axial length of the substrate.

In operation, an exhaust stream containing both gaseous pollutants and particulate matter enters the substrate via the inlet channels. The exhaust stream proceeds along the axial length of the substrate, where it passes from the upstream zone to the downstream zone. Since the inlet passages are blocked, the exhaust stream must pass the catalyst-coated internal walls of the substrate. Both the catalyst coatings and internal walls of the substrate are porous so the gaseous component of the stream can pass through the coatings and the internal walls into the outlet passages. The particulates, however, deposit in the internal walls of the substrate and are thereby removed from the exhaust stream. The filtered gas stream that passes through to the outlet passages exits the substrate via the outlet end when the outlet passages are open at the outlet end.

Figure 3:
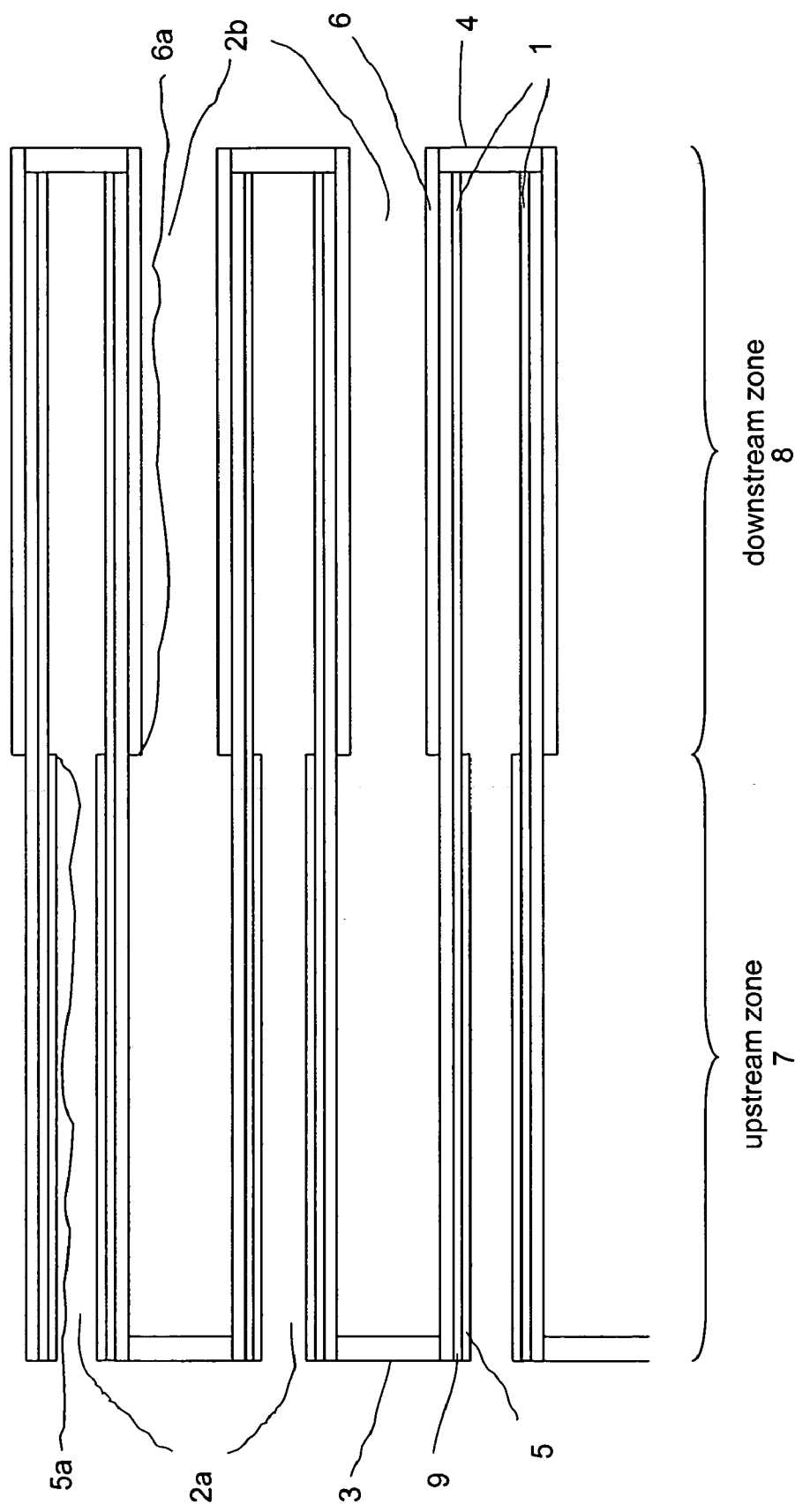
FIG. 3 shows one embodiment of the wall flow substrate of the invention (10A) viewed in a cross sectional segment having a first inlet coating, a second inlet coating and an outlet coating.

In an alternative embodiment of the catalyzed soot filter, the wall flow filter substrate (10A) contains a second inlet coating (9) interposed between the inlet walls and the first inlet coating (see FIG. 3). The second inlet coating is disposed on the internal walls (1) of the inlet passages (2a) and extends from the inlet end 3 to the outlet end 4 of the substrate. The internal walls of the inlet passages also contain the first inlet coating 5, which in this embodiment, overlies and adheres to the second inlet coating. The first inlet coating extends from the inlet end 4 of the substrate to a first inlet coating end (5a) to define a first inlet coating length. Here again, the first inlet coating length is less than the substrate axial length. For example, the first inlet coating length can be from 30 to 70% of the substrate axial length, and is preferably from 40 to 60% of the substrate axial length.

Deposited on the internal walls of the outlet passages (2b) is the outlet coating (6) that extends from the outlet end 4 of the substrate to an outlet coating end (6a) to define an outlet coating length. Here again, the outlet coating length is less than the substrate's axial length. For example, the first inlet coating length can be from 20 to 80% of the substrate axial length. Preferably, the first inlet coating length is from 30 to 70%, and more preferably, from 40 to 60% of the substrate axial length.

The sum of the first inlet coating and outlet coating lengths is substantially equal to the substrate's axial length. The lengths of the first inlet coating and the outlet coating divide the substrate into two axial zones. The first inlet coating length defines an upstream zone (7) and the outlet coating length defines a downstream zone (8) along the axial length of the substrate.

Applicants have found certain features of the coating design used in the inventive article improve its overall pollutant performance and durability. First, the permeability of the first inlet coating composition and the outlet coating composition is adjusted to assure homogeneous permeability on the internal walls along the substrate's axial length. Second, the catalyst coatings are selected so that sufficiently high platinum group metal component concentrations are disposed in the upstream zone of the wall flow substrate.

Two aspects of the inventive coating design ensure that the coated substrate maintains a homogeneous permeability for any segment of the substrate's internal wall. These aspects include the length and permeability of the inlet and outlet coatings.

First, the sum of the inlet and outlet coating lengths is substantially equal to the substrate's axial length in the inventive soot filter. Careful control of the coating lengths of the first inlet and outlet coatings minimizes the risk of inconsistent pressure drops through different internal wall segments along the substrate's length. For instance, were one segment of the internal wall to have a higher catalyst coating level than adjacent segments, a higher pressure drop would be expected across the wall segment with the higher coating level.

Second, the permeability of the outlet coating is adjusted to equal the inlet coating's permeability. At least two parameters can be used to adjust a coating's permeability. The washcoat loading of outlet composition can be adjusted to match the washcoat loading of the inlet coating. Generally, the first inlet and outlet coatings are present on the wall flow substrate at a washcoat loading ratio of 0.5 to 1.5 first inlet coating/outlet coating. More preferably, the ratio of the first inlet coating/ outlet coating is from 0.75 to 1.25, for example, about 1.0.

Furthermore, the particle size of the outlet coating can be adjusted so that the permeability of the first inlet and outlet coatings match. For example, a smaller particle size (e.g., the particle size of the catalyst support) leads to lower permeability when the composition is disposed as a coating on the substrate's internal walls. Generally, the refractory metal oxide supports used in the inlet and outlet coatings are milled so that 95% of the particles have a diameter of <5 micrometers, and preferably, <3 micrometers.

Proper optimization of these parameters allows design of a soot filter that maintains a homogeneous flow of the exhaust gases through the internal walls of the substrate along the axial length of the filter. By way of example, where the soot filter has been coated with first inlet and outlet coatings having equivalent washcoat loadings (e.g., 1.0 g/in$^3$ each), the particle size of the refractory oxide metal supports for both the first inlet and outlet coatings should be about the same, e.g., so that the particle diameters of the supports in the inlet and outlet coatings are within about 20%, and more preferably about 10% of each other.

The catalyst coatings disposed in the internal walls of the substrate serve to treat both the gaseous and particulate components as the exhaust stream passes over and through the coatings.

Typically, the gaseous component of an exhaust stream from a lean burn combustion engine (e.g., a diesel engine) contains gaseous unburned hydrocarbons, carbon monoxide and NO. Catalyst coatings promote the oxidation of the unburned hydrocarbons and carbon monoxide to carbon dioxide and water. The catalyst coatings, especially those containing platinum group metal components, also promote the oxidation of NO to $NO_2$.

Catalyst coatings also promote the oxidation of the particulate component of the exhaust stream, and thereby facilitate regeneration of the substrate. The particulate matter deposits in the internal walls of the substrate where it contacts the catalyst disposed on the internal walls. Contact between the particulate matter and the catalyst composition facilitates the combustion of the particulate matter, and regeneration of the filter.

In a preferred embodiment of the invention, treatment of the gaseous components and the particulate matter is at least partially segregated between the upstream and downstream zones of the substrate. Segregation of the reaction is achieved by disposing a higher platinum group metal concentration in the upstream zone than in the downstream zone of the substrate. Preferably, there is at least 60% of the platinum group metal components in the upstream zone. For example, there can be 70% or more of the platinum group metal components concentrated in the upstream zone. Generally, there is from 5 to 180 g/ft$^3$ of platinum group metal component in the upstream zone. For instance, there can be from 90 to 170 g/ft$^3$, and preferably from 120 to 160 g/ft$^3$ of platinum group metal component in the upstream zone.

In the embodiment of the invention exemplified in FIG. 2, the first inlet coating contains at least one first inlet platinum group metal component, and the outlet coating optionally contains an outlet platinum group metal component. In the embodiment exemplified in FIG. 3, the first inlet coating contains a first inlet platinum group metal component and the second inlet coating optionally contains a second inlet platinum group metal component.

Disposing a higher platinum group metal concentration in the upstream zone of the substrate improves the efficiency of the platinum group metal usage and allows the substrate to maintain its catalytic function even after multiple regeneration cycles.

In the preferred embodiments, disposing higher concentrations of platinum group metal components in the upstream zone than in the downstream zone improves the performance of the gaseous component conversions. Higher platinum group metal concentrations are typically needed to meet emissions goals for the gaseous components of the exhaust stream than are needed to meet the standards for the particulate components. The presence of the outlet coating in the inventive soot filter ensures that a significant proportion of the gaseous components pass through the internal walls in the upstream zone of the substrate, where a higher platinum group metal concentration is disposed. Specifically, the outlet coating compensates for the increased pressure drop across the internal walls in the upstream zone due to the higher washcoat loading associated with greater platinum group metal concentrations.

Disposing high platinum group metal concentrations in the upstream zone also favors the combustion of soot and regeneration of the filter. Platinum group metal components promote the oxidation of NO to $NO_2$, and thereby increase the concentration of $NO_2$ in the exhaust stream. Higher $NO_2$ concentrations are desirable because $NO_2$ functions as a powerful oxidant that can be used to combust the soot trapped in the substrate's internal walls. In particular, when $NO_2$ functions as the oxidant, the soot fraction of the particulate matter can be combusted at lower temperatures than those required than when $O_2$ serves as the oxidant. Generating increased concentrations of $NO_2$ in the upstream zone of the substrate allows $NO_2$ to flow toward the outlet end of the substrate and be used to combust soot deposited in the downstream zone, where higher proportions of soot are collected.

The downstream zone has a relatively lower platinum group metal concentration than does the upstream zone because a lower concentration is typically needed to combust the particulate component of the exhaust. As described above, higher proportions of the particulate matter collect and combust in the downstream zone of the soot filter than in the upstream zone.

The coating design allows the soot filter to maintain its catalytic function even after multiple regeneration cycles. While not being bound by any specific theory, Applicants believe that the coating design is well-suited to accommodate the temperature distribution associated with regeneration of the soot filter. High temperatures associated with the regeneration, e.g., >800° C., are present primarily in the downstream zone of the substrate where a higher proportion of the particulate matter collects. Such high temperatures have a deleterious effect on the catalytic activity of platinum group metal-containing catalysts. However, since a lower platinum group metal concentration is disposed in the rear of the substrate as opposed to the higher concentration in the front, most of the platinum group metal components remains comparatively unexposed to the high heats associated with soot burning. Thus, the coating design preserves the catalytic activity of the platinum metal components disposed in the upstream zone of the substrate.

The outlet coating performs at least three catalytic functions. First, the outlet coating performs a pressure-balancing function. In other words, pressure increases across the internal walls in the upstream zone caused by the deposition of the first inlet coating are compensated for by depositing the outlet coating on the internal walls of the downstream zone. Second, the outlet layer coating promotes the oxidation of any gaseous pollutants (e.g., CO and unburned hydrocarbons) that breakthrough to the outlet channels. In particular, outlet coatings that contain platinum group metal components assist in this function. Finally, the heat generated from the reactions promoted by the outlet coating serve to heat the outlet zone of the substrate to assist in the combustion of the soot.

Each of the coatings on the wall flow substrate are formed from washcoat compositions that contain one or more high surface area, refractory metal oxides, e.g., a high surface area alumina. Other additives such as binders and stabilizers can also be included in the composition. When the compositions are applied as coatings to the substrate, the proportions of ingredients are conventionally expressed as grams of material per cubic inch of coated substrate (i.e., the volume of the substrate that is coated with the indicated composition and not necessarily the total substrate volume) as this measure accommodates different gas flow passage cell sizes in different monolithic substrates. The coatings may be disposed as a thin coating on the surface of the internal walls and/or they may permeate the porous walls to some extent.

Those coatings containing catalyst components ("catalyst coatings") typically have one or more platinum group metal components supported on the high surface area, refractory metal oxides. In the case of platinum group metal components, the proportions of these components deposited are commonly expressed as grams of material per cubic foot of coated substrate. In preferred catalysts weight of the platinum group metal components recited herein are based on the weight of the metal. Preferred platinum group metal components include platinum, palladium, rhodium, and iridium components.

Platinum group metal components can be dispersed on the high surface area refractory metal oxides by impregnation with water-soluble or water-dispersible platinum group metal precursors, followed by drying and fixing steps. Suitable platinum group metal precursors include potassium platinum chloride, ammonium platinum thiocyanate, amine-solubilized platinum hydroxide, chloroplatinic acid, palladium nitrate, rhodium chloride, rhodium nitrate, hexamine rhodium chloride, and the like. Other suitable platinum group metal precursors will be apparent to those of skill in the art. The impregnated components may then be dried with the platinum group metal fixed thereon. Fixing may be carried out by calcinations or by treatment with acetic acid or by other known means, to render the platinum group metal in water-insoluble form. During calcinations, or at least during the initial phase of the catalyst, such compounds, if present are converted into the catalytically active elemental platinum group metal or its oxide (i.e., the platinum group metal component).

Useful refractory metal oxides which also function as catalyst supports in the inlet and outlet coatings can be the same or different. The refractory oxides are selected from materials such as oxides of aluminum, titanium, silicon, zirconium, rare earth metals and combinations thereof. Preferred refractory metal oxides are activated compounds selected from the group consisting of alumina, silica, silica-alumina (where silica comprises 0.5 to 10 wt. % of the support), aluminosilicates (which may be amorphous or crystalline), alumina-zirconia, alumina-chromia, and alumina-rare earth metal oxides (e.g., alumina-ceria), titania, titania-silica, titania-zirconia, and titania-alumina.

In one preferred embodiment, the refractory metal oxide is preferably substantially comprised of alumina which preferably includes the members of the gamma or activated alumina family, such as gamma and eta aluminas, and, if present, a minor amount of other refractory metal oxide, e.g., about up to 20 weight percent. Preferably, the activated alumina has a specific surface area of 60 to 300 $m^2/g$.

In other preferred embodiments, inlet and outlet coatings are preferably formed from washcoats that contain one or more rare earth metal oxides. The rare earth metal oxides are selected from one or more oxides of cerium, praseodymium, lanthanum, neodymium, and samarium. Most preferably, the rare earth metal oxide includes a cerium or praseodymium compound with the most preferred rare earth metal oxide being cerium oxide (ceria). Rare earth metal oxide supports are typically included in the coatings at a concentration up to 1.5 $g/in^3$. Preferably, such components are included in the coatings at a concentration of 0.2 to 1.0 $g/in^3$.

The rare earth metal oxide is preferably included in the washcoat composition in bulk form. By bulk form it is meant that the composition is in a solid, preferably fine particulate form, more preferably having a particle size distribution such that at least about 95% by weight of the particles typically have a diameter of from 0.1 to 5.0 micrometers, and preferably below 3 micrometers. Reference to the discussion of bulk particles is made to U.S. Pat. Nos. 4,714,694 and 5,057,483, both hereby incorporated by reference.

In some embodiments, the rare earth metal oxide support may be used with another refractory metal oxide as a co-formed composite composition. The composition is a mixture which can be characterized as a composite which may or may not be a true solid solution. The composite is preferably formed with zirconia. A particularly preferred composition is a co-precipitated ceria-zirconia composite which contains at least 10 weight percent ceria, and at least 60 weight percent zirconia. Preferably, the co-formed composite contains at least 70 weight percent zirconia. In addition, porous ceria-zirconia composite material having a pore volume of about 0.3 to 1 cc/g may also be used.

The composition may optionally contain, in addition to ceria and zirconia, one or more of lanthana, neodymia, praseodymia, yttria or mixtures thereof. Another preferred rare earth metal oxide-containing composite support is a composite containing about 5-20 wt. % ceria, 5-30 wt. % zirconia, 1-10 wt. % praseodymia and 50-80 wt. % alumina.

When present, the co-formed rare earth metal oxide-refractory metal oxide composite is present at a concentration of from 0.10 g/in$^3$ to 1.5 g/in$^3$.

In certain embodiments, the refractory metal oxide is formed from nano-structural materials. Such materials have a small particle size, i.e., typically having a particle diameter of 0.1 micrometer or less. Nano-structural materials include, for example, nano-alumina, nano-silica-alumina and nano ceria-zirconia. Nano-structural materials also include nano-crystallines zeolite such as nano-β-zeolite, nano-Y-zeolite and nano-ZSM-5 zeolite. Nano-structural materials can be especially useful in adjusting the flow characteristics of segments of the wall flow substrate's internal walls using minimal washcoat loadings due to the materials' small particle size.

In some embodiments, platinum group metal components can also be dispersed (completely or in part) onto a zeolite support. In addition to serving as a support for platinum group metal components, the zeolite component, when incorporated as described below, is able to trap unburned hydrocarbons, which might otherwise, during periods when the exhaust gas is relatively cool, escape untreated from the catalyst. It is believed that the trapped hydrocarbons are either oxidized within the zeolite or released from the zeolite only when the temperature of the catalyst composition is high enough to effectively catalyze oxidation of the trapped hydrocarbons, or both.

The zeolite component can be, for example, a zeolite selected from the group of Beta zeolite, Y-zeolite, pentasil (e.g., ZSM-5), mordenite and mixtures thereof. The zeolite when used in the invention is typically doped, e.g., ion-exchanged or impregnated, with an ion or neutral metal-containing species selected from the group consisting of one or more of hydrogen, platinum, rhodium, palladium, iridium, copper, iron, nickel, chromium and vanadium. Preferably, the zeolite component is doped with one or both of platinum and iron.

The term "doped" used to refer to a zeolite being doped with a metal or hydrogen, means that the metal or hydrogen moiety is incorporated within the pores of the zeolite, as distinguished from being dispersed on the surface of the zeolite but not to any significant degree within the pores of the zeolite. Doping of a zeolite is preferably carried out by known ion-exchange techniques in which a zeolite is repeatedly flushed with a solution containing metal cations (or an acid to provide hydrogen ions), or the zeolite pores are flooded with such solution. However, the defined terms include any suitable technique for incorporating a catalytic moiety, e.g., one or more metals as ions or neutral metal-containing species or hydrogen ions, within the pores of the zeolite, especially by exchange or replacement of cations of the zeolite. Methods for doping the zeolite are disclosed, for example, in U.S. Pat. No. 6,274,107, the disclosure of which is incorporated herein by reference.

Typically, for the purposes of the invention, the zeolite component is used in admixture with a refractory metal oxide support (e.g., silica alumina and/or bulk ceria). There is generally from about 0.025 to 0.25 g/in$^3$ of zeolite component in the catalyst coatings.

Zirconium components, preferably zirconia, can be included in the inlet and/or outlet coatings. These components act as both stabilizers and promoters. Typically, there is from about 0.02 g/in$^3$ to 0.15 g/in$^3$, and preferably about 0.05 g/in$^3$ of zirconium oxide in each of the inlet and outlet catalytic coatings.

Optionally, stabilizers can be included in either the inlet or outlet catalytic segments. As disclosed in U.S. Pat. No. 4,727,052, support materials, such as activated alumina, can be thermally stabilized to retard undesirable alumina phase transformations from gamma to alpha at elevated temperatures. Stabilizers can be selected from at least one alkaline earth metal components selected from the group consisting of magnesium, barium, calcium and strontium, preferably strontium and barium. When present, stabilizers materials are added at from about 0.01 g/in$^3$ to 0.15 g/in$^3$ in the coating.

One preferred coating composition that may be used as either a first/second inlet or outlet coating contains:

0.1 to 2.0 g/in$^3$ of gamma alumina or silica-alumina (e.g., 1.5 wt. % silica on alumina); and 0.05 to 1 g/in$^3$ of ceria-zirconia-praseodymia composite (containing 5-60 wt. % ceria, 30-85 wt. % zirconia, 5-10 wt. % praseodymia);

The coating composition optionally contains one or more platinum group metal components.

Another preferred coating composition that may be used as either a first/second inlet or outlet coating contains:

0.1 to 2.0 g/in$^3$ of gamma alumina or silica-alumina (e.g., 1.5 wt. % silica on alumina);

0.05 to 1 g/in$^3$ of ceria-zirconia-praseodymia composite (containing 5-60 wt. % ceria, 30-85 wt. % zirconia, 5-10 wt. % praseodymia); and 0.025 to 0.25 g/in$^3$ of a zeolite selected from the group consisting of Beta-zeolite, iron-doped Beta zeolite, USY (Ultra-Stable Y)-zeolite and ZSM-5 zeolite.

The coating composition optionally contains one or more platinum group metal components.

Wall Flow Substrates

Wall flow substrates have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 400 flow passages (or "cells") per square inch of cross section, although far fewer may be used. For example, the carrier may have from about 7 to 400, more usually from about 100 to 400, cells per square inch ("cpsi"). The cells can have cross sections that are rectangular, square, circular, oval, triangular, hexagonal, or are of other polygonal shapes.

Preferred wall flow filter substrates are composed of ceramic-like materials such as cordierite, α-alumina, silicon carbide, silicon nitride, zirconia, mullite, spodumene, alumina-silica-magnesia or zirconium silicate, or of refractory metals such as stainless steel. Preferred wall flow substrates are formed from cordierite and silicon carbide. Such materials are able to withstand the environment, particularly high temperatures, encountered in treating the exhaust streams.

Ceramic wall flow substrates are typically formed of a material having a porosity of about 40 to 70%. For instance in some configurations, a wall flow substrate having a porosity of 60% and a mean pore diameter of about 15-25 microns provide adequate exhaust flow.

In addition, both the cell density and the wall thickness affect the exhaust flow characteristics and the pressure drop that is observed in the exhaust system. Configurations that use wall flow filter with 100 cpsi that have a 17 mil wall, and wall flow substrate with 300 cpsi and a 12-14 mil wall both provide flow and pressure drops across the filter substrate that are useful in the article of the invention.

The following examples further illustrate the present invention, but of course, should not be construed as in any way limiting its scope.

EXAMPLE 1

Homogeneous Catalyst Coating: Reference Catalyst A

This catalyst composition was coated on a silicon carbide filter used with the intention to trap particulate matter (soot) and abate the residual hydrocarbon and CO generated in the diesel exhaust during combustion.

This catalyst coating was made by impregnating 313 g of a solution of amine-solubilized platinum hydroxide (about 17% Pt) onto 546 g of 1.5% silica alumina support (120 m$^2$/g) followed by fixing the Pt using acetic acid solution. This material made into a slurry of about 40% solid then milled to a particle size less than 8 microns. After milling, 1100 g of $CeO_2$—$Pr_6O_{11}$—$ZrO_2$ composite (containing 30 wt. % ceria, 10 wt. % praeseodymia, and 60 wt. % zirconia) was added to the slurry followed by zirconyl acetate (296 g at 30% $ZrO_2$) and milled further to less than 5 microns. The slurry was then diluted to about 30% solid. The slurry was used to coat one of the walls of a silicon carbide wall flow filter substrate (dimensions 5.66"×6.0", 300 cpsi) to a washcoat loading measured after calcination at of about 1 g/in$^3$ and Pt=75 g/ft$^3$. The coated side of the filter was used as the inlet for the exhaust gas emitted from the diesel engine used in the evaluation. This coated filter substrate is referred to as Reference Catalyst A.

EXAMPLE 2

Catalyst B

This soot filter had the coating design as shown in FIG. 3, and had a first inlet coating, a second inlet coating and an outlet coating.

The slurries for each of the coatings were prepared identically except for the differing concentrations of platinum and different solids content. The platinum concentrations and the solids content were adjusted to achieve the target washcoat loading for each coating. The slurries were made by impregnating the Pt salt solution onto gamma-alumina. Acetic acid was used to precipitate the Pt. The impregnated alumina was made into a slurry about 40% solids by adding water and some acetic acid. Zirconium acetate was added and the slurry was milled to an average particle size less than 5 microns. Three slurries were made based on the above procedure and each slurry was coated in the following order:

Second Inlet Coating: 100% of the inlet of the filter was coated to give a washcoat loading based on calcined weight of about 0.27 g/in$^3$, a zirconia concentration of 0.05 g/in$^3$ and a Pt concentration of about 30 g/ft$^3$. After coating the inlet, the filter was dried and calcined at 450° C. for 1 h.

First Inlet Coating: 50% of the inlet of the filter was coated to give a washcoat loading based on calcined weight of about 0.45 g/in$^3$, a zirconia concentration of 0.05 g/in$^3$ and a Pt concentration of about 60 g/ft$^3$. After coating the inlet, the filter was dried and calcined at 450° C. for 1 h.

Outlet Coating: 50% of the outlet of the filter was coated to give a washcoat loading based on calcined weight of about 0.27 g/in$^3$, a zirconia concentration of 0.05 g/in$^3$ and a Pt concentration of about 30 g/ft$^3$. After coating the inlet, the filter was dried and calcined at 450° C. for 1 h.

The average washcoat loading on the silicon carbide filter was about 0.6 g/in$^3$ with Pt concentration of 75 g/ft$^3$. This coated filter substrate is referred to as Catalyst B.

EXAMPLE 3

Catalyst C

This soot filter had the coating design as shown in FIG. 3, and had a first inlet coating and an outlet coating.

The slurries for each of the coatings were prepared identically except for the differing concentrations of platinum and different solids content. The platinum concentrations and the solids content were adjusted to achieve the target washcoat loading for each coating. The slurries were made by impregnating the Pt salt solution onto gamma-alumina. Acetic acid was used to precipitate the Pt. The impregnated alumina was made into a slurry about 40% solids by adding water and acetic acid. Zirconium acetate was added and the slurry was milled to an average particle size less than 5 microns. Two slurries were made based on the above procedure and each slurry was coated in the following order:

First Inlet Coating: 50% of the inlet of the filter was coated to give a washcoat loading based on calcined weight of about 0.6 g/in$^3$, a zirconia concentration of 0.05 g/in$^3$ and a Pt concentration of about 100 g/ft$^3$. After coating the inlet, the filter was dried and calcined at 450° C. for 1 h.

Outlet Coating: 50% of the outlet of the filter was coated to give a washcoat loading based on calcined weight of about 0.6 g/in$^3$, a zirconia concentration of 0.05 g/in$^3$ and a Pt concentration of about 50 g/ft$^3$. After coating the outlet, the filter was dried and calcined at 450° C. for 1 h.

The average washcoat loading on the silicon carbide filter was about 0.6 g/in$^3$ with Pt concentration of 75 g/ft$^3$. This coated filter substrate is referred to as Catalyst C.

EXAMPLE 4

Catalyst Testing Procedure & Evaluation Results for Reference Catalyst A, Catalyst B and Catalyst C During the lifetime of a coated soot filter, multiple regeneration events occur which cause a decrease of the activity of the catalytic coating.

A vehicle was used to evaluate these coated filters according to the New European Driving Cycle (NEDC) test specified in ECE regulations 83, ECE regulations 70/220 EC 98169." The number of cycles used in the evaluation was 14.

Figure 4:
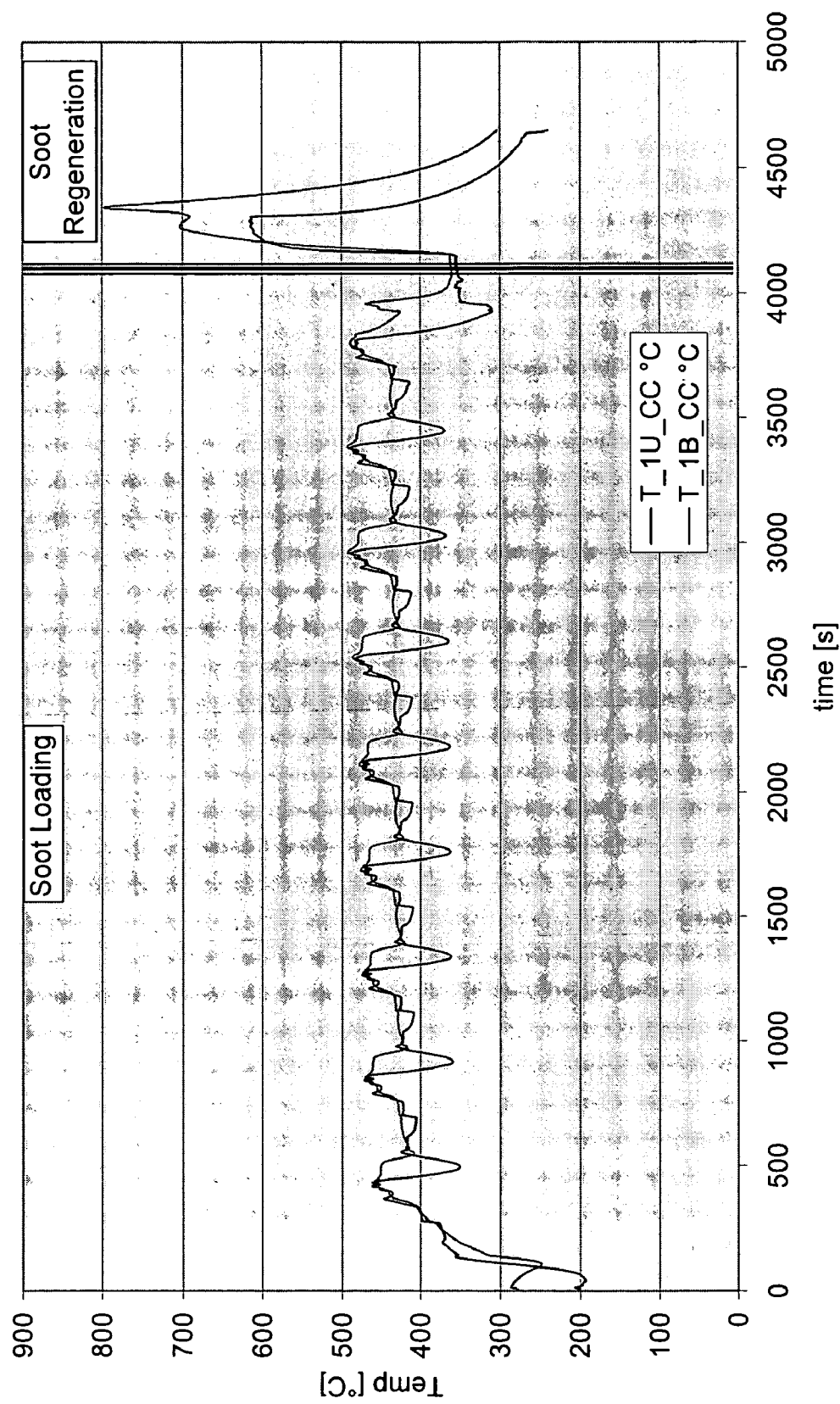
FIG. 4 shows a graphical representation of a soot loading regeneration procedure.

FIG. 4 shows an evaluation procedure that simulates the aging effect that occurs in real mode operation. A coated soot filter was loaded with 10 g/L soot, the soot was ignited and then speed was reduced to generate an exotherm with 800° C. target temperature.

Table 1 shows a comparison between homogeneously coated reference and zoned concept technologies with homogeneous flow distribution. The table shows the improvement of the zoned technologies in bag results after vehicle evaluation before (referred to as "Fresh") and after soot loading/regeneration.

TABLE 1

|  | Fresh | | After Soot Loading/ Regeneration | |
| --- | --- | --- | --- | --- |
|  | HC | CO | HC | CO |
| Catalyst C | 47% | 61% | 54% | 46% |
| Catalyst B | 42% | 39% | 25% | 26% |

Catalyst C showed the best performance after this type of aging. It reduced the hydrocarbon and CO over the homogeneous coating by almost 50%. This clearly shows that Catalyst C is capable of tolerating high aging conditions. Although Catalyst C showed the best performance, Catalyst B still showed significant performance and durability improvements over the homogeneous coating Catalyst A.

EXAMPLE 4

Homogeneous Catalyst Coating: Reference Catalyst D

This catalyst was coated on a silicon carbide filter used with the intention to trap particulate matter (soot) and abate the residual hydrocarbon and CO generated in the diesel exhaust during combustion. This catalyst coating was made by impregnating a solution (containing about 17% Pt) of amine-solubilized platinum hydroxide onto an alumina based support followed by fixing the Pt using acetic acid solution. This material made into a slurry of about 40% solid then milled to a particle size less than 5 microns. After milling, $CeO_2$—$Pr_6O_{11}$—$ZrO_2$ composite (containing 30 wt. % ceria, 10 wt. % praeseodymia, and 60 wt. % zirconia) was added to the slurry followed by zirconium acetate and milled further to less than 5 microns. The slurry was then diluted to about 25% solid. The slurry was used to coat the inlet (only) wall of the silicon carbide filter (dimensions 5.66"×6.0", 300 cpsi) to a washcoat loading measured after calcination at of about 1 g/in$^3$ and Pt=75 g/ft$^3$. The catalyst composition contained: 0.6 g/in$^3$ $Al_2O_3$, 0.3 g/in$^3$ $CeO_2$—$Pr_6O_{11}$—$ZrO_2$, 0.05 g/in$^3$ $ZrO_2$, and 90 g/ft$^3$ Pt. The coated side of the filter was used as the inlet for the exhaust gas emitted from the diesel engine used in the evaluation. This coated filter is referred to as Reference Catalyst D.

EXAMPLE 5

Catalyst E

This soot filter had the coating design as shown in FIG. 2, and had a first inlet coating and an outlet coating.

The slurries for each of the coatings were prepared identically except for the differing concentrations of platinum and different solids content. The platinum concentrations and the solids content were adjusted to achieve the target washcoat loading for each coating. The slurries were made by impregnating amine-solubilized platinum hydroxide salt solution onto alumina based support (1.5% silica/alumina). Acetic acid was used to precipitate the Pt. The impregnated alumina was made into a slurry of about 40% solids by adding water and acetic acid.

Zirconium acetate was added and the slurry was milled to an average particle size less than 5 microns. Two slurries were made based on the above procedure and each slurry was coated in the following order on to a silicon carbide filter (dimensions 5.66"×6", 300 cpsi) in the following order:

First Inlet Coating: 50% of the inlet of the filter was coated to give a washcoat loading based on calcined weight of about 0.735 g/in$^3$. The first inlet coating contained 0.6 g/in$^3$ $SiO_2$—$Al_2O_3$, 0.05 g/in$^3$ $ZrO_2$ and 120 g/ft$^3$ Pt. After coating the inlet, the filter was dried and calcined at 450° C. for 1 h.

Outlet Coating: 50% of the outlet of the filter was coated to give a washcoat loading based on calcined weight of about 0.735 g/in$^3$. The outlet coating contained 0.6 g/in$^3$ $SiO_2$—$Al_2O_3$, 0.05 g/in$^3$ $ZrO_2$ and 60 g/ft$^3$ Pt. After coating the outlet, the filter was dried and calcined at 450° C. for 1 h.

The average washcoat loading on the silicon carbide filter was about 0.6 g/in$^3$ with Pt concentration of 90 g/ft$^3$. This coated filter is referred to as Catalyst E.

EXAMPLE 6

Catalyst F

This soot filter had the coating design as shown in FIG. 2, and had a first inlet coating and an outlet coating.

The slurries for each of the coatings were prepared identically except for the differing concentrations of platinum and different solids content. The platinum concentrations and the solids content were adjusted to achieve the target washcoat loading for each coating. The slurries were made by impregnating amine-solubilized platinum hydroxide solution onto alumina based support (1.5% silica/alumina). Acetic acid was used to precipitate the Pt. The impregnated alumina was made into a slurry about 40% solids by adding water and acetic acid.

Zirconium acetate was added and the slurry was milled to an average particle size less than 5 microns. Two slurries were made based on the above procedure and each slurry was coated in the following order on to a silicon carbide filter (dimensions 5.66"×6", 300 cpsi) in the following order:

First Inlet Coating: 50% of the inlet of the filter was coated to give a washcoat loading based on calcined weight of about 0.735 g/in$^3$. The first inlet coating contained 0.6 g/in$^3$ $SiO_2$—$Al_2O_3$, 0.05 g/in$^3$ $ZrO_2$ and 150 g/ft$^3$ Pt. After coating the inlet, the filter was dried and calcined at 450° C. for 1 h.

Outlet Coating: 50% of the outlet of the filter was coated to give a washcoat loading based on calcined weight of about 0.735 g/in$^3$. The outlet coating contained 0.6 g/in$^3$ $SiO_2$—$Al_2O_3$, 0.05 g/in$^3$ $ZrO_2$ and 30 g/ft$^3$ Pt. After coating the outlet, the filter was dried and calcined at 450° C. for 1 h.

The average washcoat loading on the silicon carbide filter was about 0.6 g/in$^3$ with Pt concentration of 90 g/ft$^3$. This coated filter is referred to as Catalyst F.

EXAMPLE 7

Aging of Catalysts D, E, & F

In one set of aging the three catalyzed soot filters were aged at 850° C. in 10% steam/air for 12 hours. In the second set of aging the coated soot filters were aged for 12 h at 620° C. on an engine bench.

Evaluation of Catalysts D, E, & F:

A vehicle was used to evaluate these coated filters according to the New European Driving Cycle (NEDC) test specified in ECE regulations 83, ECE regulations 70/220 EC 98169." The CO and HC emitted from tailpipe is measured by collecting different bags within the testing cycle. The term "Stabilized" refers to a fresh catalyst treated for 20 min at 620° C. The term "Aged" refers to a catalyst treated at 850° C. in 10% steam/air for 5 h. The results are shown in Table 2.

TABLE 2

|  | Catalyst D Stabilized (g/km) | Catalyst E Stabilized (g/km) | Catalyst F Stabilized (g/km) | Catalyst D Aged (g/km) | Catalyst E Aged (g/km) | Catalyst F Aged (g/km) |
| --- | --- | --- | --- | --- | --- | --- |
| CO Bag 1 | 0.19 | 0.187 | 0.18 | 0.17 | 0.152 | 0.13 |
| CO Bag 2 | 0.135 | 0.123 | 0.077 | 0.054 | 0.032 | 0.016 |
| CO Bag 3 | 0.005 | 0.003 | 0.002 | 0.009 | 0.006 | 0.007 |
| HC Bag 1 | 0.035 | 0.035 | 0.036 | 0.029 | 0.027 | 0.023 |
| HC Bag 2 | 0.034 | 0.034 | 0.027 | 0.017 | 0.012 | 0.010 |
| HC Bag 3 | 0.005 | 0.005 | 0.005 | 0.005 | 0.004 | 0.004 |

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A catalyzed soot filter, comprising:
    a wall flow substrate comprising an inlet end, an outlet end, a substrate axial length extending between the inlet end and the outlet end, and a plurality of passages defined by internal walls of the wall flow substrate;
    wherein the plurality of passages comprise inlet passages having an open inlet end and a closed outlet end, and outlet passages having a closed inlet end and an open outlet end;
    wherein the internal walls of the inlet passages comprise a first inlet coating that extends from the inlet end to a first inlet coating end, thereby defining a first inlet coating length, wherein the first inlet coating length is less than the substrate axial length;
    wherein the internal walls of the outlet passages comprise an outlet coating that extends from the outlet end to a outlet coating end, thereby defining a outlet coating length, wherein the outlet coating length is less than the substrate axial length;
    wherein the sum of the first inlet coating and outlet coating lengths is substantially equal to the substrate axial length;
    wherein the first inlet coating length defines an upstream zone and the outlet coating length defines a downstream zone;
    wherein the first inlet coating comprises at least one first inlet platinum group metal component;
    wherein the outlet coating comprises at least one outlet coating platinum group metal component; and,
    wherein at least 50% of the platinum group metal components are present in the upstream zone.

2. The catalyzed soot filter of claim 1, wherein the first inlet and outlet coatings are present on the wall flow substrate at a washcoat loading ratio of 0.5 to 1.5 first inlet coating/outlet coating.

3. The catalyzed soot filter of claim 1, wherein the upstream zone is from 20 to 80% of the substrate axial length.

4. The catalyzed soot filter of claim 1, wherein the platinum group metal components are present in the inlet zone from 5 to 180 g/ft$^3$.

5. The catalyzed soot filter of claim 1, wherein at least one platinum group metal component is present in the outlet zone from 2 to 90 g/ft$^3$.

6. The catalyzed soot filter of claim 1, wherein both the inlet and outlet coating comprise a refractory metal oxide selected from the group consisting of alumina, silica, silica-alumina, alumino-silicates, alumina-zirconia, alumina-chromia, alumina-rare earth metal oxides, titania, titania-silica, titania-zirconia, and titania-alumina.

7. The catalyzed soot filter of claim 1, wherein at least one of the inlet and outlet coatings comprise a rare earth metal oxide selected from an oxide of cerium, praseodymium, lanthanum, neodymium and samarium.

8. The catalyzed soot filter of claim 1, wherein at least one of the inlet and outlet coatings comprise nano-structural materials having a pore size of 0.1 micrometer or less.

9. The catalyzed soot filter of claim 1, wherein at least one of the inlet and outlet coatings comprise a zeolite.

10. The catalyzed soot filter of claim 1, wherein the internal walls of the inlet passages further comprise a second inlet coating interposed between the inlet walls and the first inlet coating, and wherein the second inlet coating extends from the inlet end to the outlet end of the substrate.

11. The catalyzed soot filter of claim 1, wherein the first inlet and outlet coatings are present on the wall flow substrate at a washcoat loading ratio of 0.75 to 1.25 first inlet coating/outlet coating.

12. An exhaust article, comprising:
    a wall flow substrate comprising an inlet end, an outlet end, having a length extending between the inlet end to the outlet end and a plurality of passages defined by the internal walls of the wall flow substrate;
    wherein at least some of the passages have an opening at the inlet end and are plugged at the outlet end, and at least some of the passages have an opening at the outlet end are plugged at the inlet end;
    a first catalyst coating disposed on the internal walls of the wall flow substrate from the outlet end to a first coating end and extending for at least part of the length of the wall flow substrate;
    wherein the first catalyst coating comprises a first co-formed ceria-zirconia-praseodymia composite and a first refractory metal oxide; and
    a second catalyst coating disposed on the internal walls of the wall flow substrate from the inlet end to a second coating end, thereby defining an inlet zone, wherein the inlet zone is no more than 50% of the length of the wall-flow substrate; wherein the second catalyst coating comprises a second platinum group metal component.

13. The exhaust article of claim 12, wherein the first catalyst coating extends for at least 80% of the length of the wall flow substrate.

14. The exhaust article of claim 12, wherein the first catalyst coating extends for the entire length of the wall flow substrate.

15. The exhaust article of claim 12, wherein the first catalyst coating comprises from 20 to 80 wt. % of the first co-formed ceria-zirconia-praseodymia composite; and from 20 to 80 wt. % of the first refractory metal oxide.

16. The exhaust article of claim 12, wherein the first catalyst coating further comprises a first platinum group metal component.

17. The exhaust article of claim 12, wherein the first refractory metal oxide is selected from the group consisting of alumina, zirconia, silica, titania, silica-alumina, zeolites, magnesium oxide, hafnium oxide, lanthanum oxide and yttrium oxide.

18. The exhaust article of claim 12, wherein the second catalyst coating further comprises a second refractory metal oxide selected from the group consisting of alumina, zirconia, silica, titania, silica-alumina, zeolites, magnesium oxide, hafnium oxide, lanthanum oxide and yttrium oxide.

19. The exhaust article of claim 18, wherein the second catalyst coating further comprises a second co-formed ceria-zirconia-praseodymia composite.

20. The exhaust article of claim 19, wherein the second catalyst coating comprises from 20 to 80 wt. % of the second co-formed ceria-zirconia-praseodymia composite; and from 20 to 80 wt. % of the second refractory metal oxide.

21. The exhaust article of claim 12, wherein the first inlet and outlet coatings are present on the wall flow substrate at a washcoat loading ratio of 0.75 to 1.25 first inlet coating/outlet coating.

\* \* \* \* \*